(12) United States Patent
Sakamoto et al.

(10) Patent No.: US 11,247,702 B2
(45) Date of Patent: Feb. 15, 2022

(54) VEHICLE CONTROL DEVICE AND ELECTRONIC CONTROL SYSTEM

(71) Applicant: Hitachi Automotive Systems, Ltd., Hitachinaka (JP)

(72) Inventors: Hideyuki Sakamoto, Hitachinaka (JP); Tadanobu Toba, Tokyo (JP); Toshiaki Nakamura, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/956,386

(22) PCT Filed: Dec. 4, 2018

(86) PCT No.: PCT/JP2018/044483
§ 371 (c)(1),
(2) Date: Jun. 19, 2020

(87) PCT Pub. No.: WO2019/131002
PCT Pub. Date: Jul. 4, 2019

(65) Prior Publication Data
US 2020/0361487 A1    Nov. 19, 2020

(30) Foreign Application Priority Data

Dec. 25, 2017 (JP) .............................. JP2017-248462

(51) Int. Cl.
*B60W 60/00* (2020.01)
*B60W 30/095* (2012.01)
(Continued)

(52) U.S. Cl.
CPC .... *B60W 60/0015* (2020.02); *B60W 30/0953* (2013.01); *B60W 30/0956* (2013.01);
(Continued)

(58) Field of Classification Search
CPC ......... B60W 60/0015; B60W 30/0953; B60W 30/0956; B60W 50/0205; G01C 21/3407; G05B 9/02
See application file for complete search history.

(56) References Cited

U.S. PATENT DOCUMENTS

2015/0254986 A1* 9/2015 Fairfield .................. G08G 1/22
707/687
2015/0344039 A1   12/2015 Amoh
(Continued)

FOREIGN PATENT DOCUMENTS

| JP | 2003-115847 A | 4/2003 |
|----|---------------|--------|
| JP | 2015-93498 A | 5/2015 |
| JP | 6189004 B1 | 8/2017 |
| JP | 2017-222328 A | 12/2017 |

OTHER PUBLICATIONS

International Search Report with English translation and Written Opinion issued in corresponding application No. PCT/JP2018/044483 dated Mar. 26, 2019.

*Primary Examiner* — Hussein Elchanti
(74) *Attorney, Agent, or Firm* — Foley & Lardner LLP (57) ABSTRACT

Even in a case where an operation abnormality occurs in the arithmetic processing unit of the control device, control is safely shifted to the degeneration control microcomputer, and a vehicle control device capable of improving safety is realized.
There are provided an outside world recognition microcomputer 10*b*, a control microcomputer 11*b* that outputs a control command to the actuator control device, and a degeneration control microcomputer 12*b* to which control is shifted in a case where an abnormality occurs in the control microcomputer 11*b*. The outside world recognition microcomputer 10*b* calculates a collision potential based on information from the outside world, and determines whether to reset the control microcomputer 11*b* when an abnormality
(Continued)

occurs in the control microcomputer 11b or to shift control to the degeneration control microcomputer 12b.

12 Claims, 6 Drawing Sheets

(51) Int. Cl.
| | |
|---|---|
| *B60W 50/02* | (2012.01) |
| *B60W 50/023* | (2012.01) |
| *B60W 50/04* | (2006.01) |
| *G01C 21/34* | (2006.01) |
| *G05B 9/02* | (2006.01) |

(52) U.S. Cl.
CPC ...... *B60W 50/023* (2013.01); *B60W 50/0205* (2013.01); *B60W 50/04* (2013.01); *G01C 21/3407* (2013.01); *G05B 9/02* (2013.01); *B60W 2552/00* (2020.02); *B60W 2554/80* (2020.02)

(56) References Cited

U.S. PATENT DOCUMENTS

| | | | |
|---|---|---|---|
| 2016/0197484 A1* | 7/2016 | Jost | G01D 21/00 |
| | | | 307/116 |
| 2016/0334230 A1* | 11/2016 | Ross | G01C 21/3415 |
| 2017/0018179 A1* | 1/2017 | Gutierrez | G08G 1/096725 |
| 2017/0141873 A1* | 5/2017 | Mandeville-Clarke | |
| | | | G08G 1/202 |
| 2017/0255199 A1* | 9/2017 | Boehmke | G01S 7/4817 |
| 2017/0262709 A1* | 9/2017 | Wellington | G06K 9/6201 |
| 2018/0032076 A1* | 2/2018 | Lombrozo | B60W 30/09 |
| 2018/0040246 A1* | 2/2018 | Yonemura | G08G 1/161 |
| 2018/0053141 A1* | 2/2018 | Shydo, Jr. | G05D 1/104 |
| 2018/0075538 A1* | 3/2018 | Konrardy | B60Q 9/00 |
| 2018/0082494 A1* | 3/2018 | Rech | G01C 21/3415 |
| 2018/0204398 A1* | 7/2018 | Smith | G07C 5/008 |
| 2018/0349784 A1* | 12/2018 | Zheng | G06K 9/00791 |
| 2019/0163176 A1* | 5/2019 | Wang | G05D 1/0061 |

* cited by examiner

| | DEGENERATION REQUEST SIGNAL 10f | |
|---|---|---|
| | Low | High |
| ABNORMALITY NOTIFICATION | NO OUTPUT | OUTPUT |
| SELECT RESET TIMING SWITCHING CIRCUIT 11s | 11u SIDE | 11t SIDE |
| RESET TIMING OF CONTROL MICROCOMPUTER 11b | ABNORMALITY DETECTION TIME T1 | ABNORMALITY DETECTION TIME T2 |

SWITCHING OF DEGENERATION REQUEST SIGNAL AND RESET TIMING OF CONTROL MICROCOMPUTER

| EXTERNAL SITUATION | | OUTSIDE WORLD INFORMATION AMOUNT | DEGENERATION REQUEST SIGNAL 10f | RESET TIMING OF CONTROL MICROCOMPUTER |
|---|---|---|---|---|
| DRIVING ROAD | DISTANCE TO SURROUNDING OBJECT | | | |
| STRAIGHT | FAR | LESS | Low | ABNORMALITY DETECTION T1 |
| CURVED | CLOSE | MUCH | High | ABNORMALITY DETECTION T2 |

RELATION BETWEEN EXTERNAL SITUATION AND DEGENERATION REQUEST SIGNAL

FIG. 12

VEHICLE CONTROL DEVICE AND ELECTRONIC CONTROL SYSTEM

TECHNICAL FIELD

The present invention relates to a vehicle control device and an electronic control system of an automatic driving system.

BACKGROUND ART

In order to realize an advanced automatic driving system, an ECU (Electronic Control Unit), which is a higher-level control device that controls automatic driving, is required to continue the operation for a certain period of time until the driving operation is handed over to the driver even when a failure has occurred in an arithmetic processing device (microcomputer) which performs calculations for the automatic driving control.

PTL 1 discloses a control device of a vehicle in which, when the operation of a microcomputer of a main control device is in a normal state and a power supply voltage of the microcomputer is out of an appropriate range, a control function of a plurality of sub-control devices is partially restricted.

CITATION LIST

Patent Literature

PTL 1: JP 2015-93498 A

SUMMARY OF INVENTION

Technical Problem

An automatic driving system includes, for example, a vehicle control device that outputs a control command, and a plurality of actuator control devices that respectively execute engine control, brake control, power steering control, and the like based on a control command from the vehicle control device.

Here, in the automatic driving system, from the viewpoint of functional safety, the operation of the microcomputer is monitored by a diagnostic circuit, such as a watchdog timer that monitors program runaway in the microcomputer, and failure processing is performed by detecting abnormality of the microcomputer. However, in a case where processing such as uniformly stopping (resetting) the microcomputer in response to the abnormality of the microcomputer is performed, the function of the automatic driving system will be stopped.

However, when the function of the automatic driving system is suddenly stopped, the vehicle occupant needs to take over the driving of the vehicle, but there is a time until the vehicle occupant takes over the driving, so control interpolation by the vehicle system is necessary, and a technology for that case is required.

As means for solving the above-mentioned problem, PTL describes control in a case where the power supply voltage of the microcomputer is out of an appropriate range while the operation of the microcomputer is normal. However, it is necessary to consider the abnormal operation of the microcomputer itself due to factors such as microcomputer overload, and it is difficult to avoid resetting the microcomputer.

In addition, when the microcomputer of the ECU that arbitrates a plurality of drive power sources becomes abnormal, it notifies the ECU that controls the drive source appropriately and performs idling, emergency stop, etc. Therefore, it is possible to prevent the occurrence of an abnormality of the driving force.

However, even if the ECU that controls the external drive power source is notified of the microcomputer abnormality when the microcomputer is abnormal, there is a concern that the control cannot be appropriately shifted due to the magnitude of the control scale depending on the external situation of the own vehicle.

Then, in a case where an abnormality is detected in the operation of the control microcomputer that controls the operation of the automatic driving system, a method of shifting the control from the control microcomputer to a degeneration control microcomputer can be considered.

However, it is difficult to avoid a control transition time, that is, a blank section of control, for the degeneration control microcomputer to switch control after receiving the abnormality notification, and this involves a control transition risk.

In addition, there is a problem that the risk of control transition differs depending on the relation with objects around the own vehicle.

The invention has been made in view of the above-described problems, and an object thereof is to realize a vehicle control device and an electronic control system which, even in a case where an operation abnormality occurs in the arithmetic processing unit in the control device, the control can be safely transferred to the degeneration control microcomputer, and can improve safety.

Solution to Problem

In order to achieve the above object, the invention is configured as follows.

A vehicle control device includes a control command generation unit that generates a control command for a drive device of the vehicle, an outside world recognition unit that recognizes external information of the vehicle, and a monitoring circuit that includes a monitoring unit to monitor an operation of the control command generation unit and a reset generation unit to reset the control command generation unit when the monitoring unit detects an abnormality of the control command generation unit. The monitoring unit includes a first monitoring unit that detects an abnormality in the control command generation unit at a first abnormality detection time after an abnormality has occurred in the control command generation unit, and a second monitoring unit that detects an abnormality in the control command generation unit at a second abnormality detection time longer than the first abnormality detection time after an abnormality has occurred in the control command generation unit. The monitoring circuit determines whether the control command generation unit is reset by the reset generation unit according to an abnormality detection of the first monitoring unit, or the control command generation unit is reset by the reset generation unit according to an abnormality detection of the second monitoring unit based on outside world information of the vehicle recognized by the outside world recognition unit.

In addition, an electronic control system includes an outside world recognition unit, a first control unit that drives a drive device, a second control unit that receives information from the outside world recognition unit, and transmits a control command to the first control unit, and a third control unit that shifts control to command a degeneration operation to the first control unit in a case where the second control unit detects an abnormality. In a case where the outside world recognition unit determines an external situation having a high possibility of collision to an external object, and an abnormality of the second control unit is detected, the second control unit shifts control to the third control unit and resets the second control unit. In a case where the outside world recognition unit determines an external situation where the possibility of collision with an external object is low, and the abnormality of the second control unit is detected, the second control unit is reset and a control command operation is returned.

Advantageous Effects of Invention

According to the invention, even in a case where an operation abnormality occurs in the arithmetic processing unit in the control device, the control can be safely transferred to the degeneration control microcomputer, and a vehicle control device and an electronic control system capable of improving safety can be realized.

DESCRIPTION OF EMBODIMENTS

Hereinafter, embodiments of the invention will be described with reference to the accompanying drawings.

Embodiments (Configuration Example of Automatic Driving System)

First, the configuration of an automatic driving system (vehicle control system) to which the invention is applied will be described.

Figure 1:
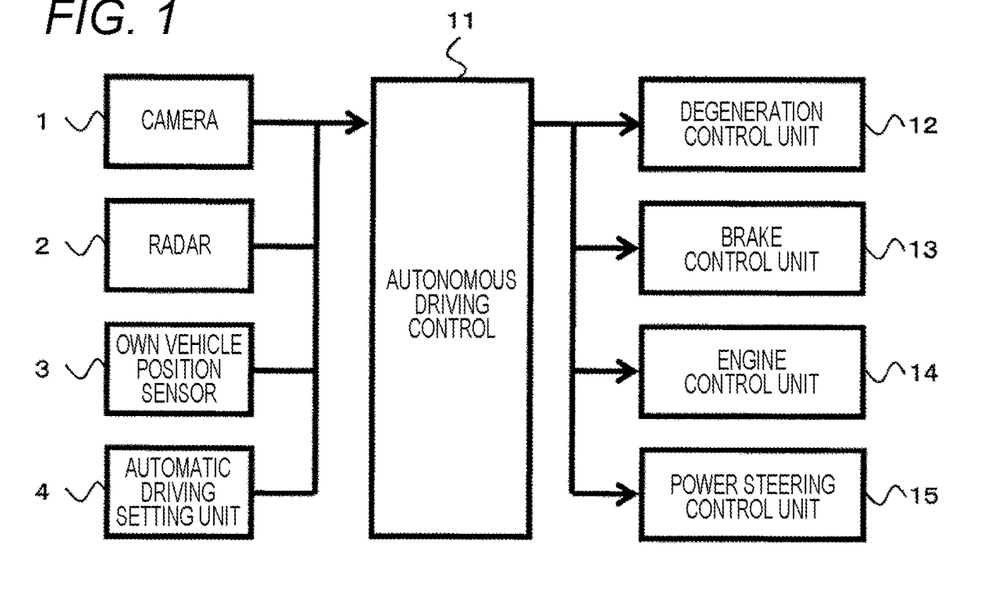
FIG. 1 is a schematic configuration diagram of an automatic driving system provided in a vehicle to which the invention is applied.

FIG. 1 is a schematic configuration diagram of an automatic driving system provided in a vehicle to which the invention is applied. In FIG. 1, the automatic driving system includes a camera (first sensor) 1, a radar (second sensor) 2, and an own vehicle position sensor (third sensor) 3, which are external recognition sensors for recognizing the external situation of the vehicle, and an automatic driving setting unit 4 for setting automatic operation.

Further, the automatic driving system includes an autonomous driving control unit (first ECU) 11 (vehicle control device), a degeneration control unit (second ECU) 12, a brake control unit (third ECU) 13, an engine control unit (fourth ECU) 14, and a power steering control unit (fifth ECU) 15.

Further, the brake control unit 13, the engine control unit 14, and the power steering control unit 15 can be a drive device control unit or an actuator control unit that controls the operation of the vehicle.

The camera 1, the radar 2, the own vehicle position sensor 3, the autonomous driving control unit 11, the degeneration control unit 12, the brake control unit 13, the engine control unit 14, and the power steering control unit 15 are connected to an in-vehicle network (for example, CAN (Controller Area Network) or Ethernet (registered trademark)).

The degeneration control unit 12 is a control device that operates so as to execute appropriate degeneration control as a backup when the autonomous driving control unit 11 fails. However, in a case where security can be ensured by providing a degeneration control function in the control unit 11 even if the autonomous driving control unit 11 fails, the degeneration control unit 12 is unnecessary.

The brake control unit 13 is a control device that performs vehicle brake control (braking force control), and the engine control unit 14 is a control device that controls an engine that generates a driving force of the vehicle. In addition, the power steering control unit 15 is a control device that controls power steering of the vehicle.

The own vehicle position sensor 3 is a device that acquires the position of the own vehicle using radio waves from a positioning satellite such as a GPS (Global Positioning System). The own vehicle position sensor 3 outputs the obtained own vehicle position information to the autonomous driving control unit 11. Further, the own vehicle position sensor 3 may acquire the vehicle position information using a positioning system other than the GPS.

In addition, the own vehicle position sensor 3 has a memory for storing map data used in automatic driving, and stores map data such as a road width, the number of lanes, a gradient, a curvature of a curve, an intersection shape, and speed limit information. Further, the map data may be stored inside the autonomous driving control unit 11.

The automatic driving setting unit 4 is a device that sets a destination, a route, a driving speed, and the like during automatic operation. The automatic driving setting unit 4 has an input device (not illustrated) for the passenger to make settings.

This input device includes, for example, a start switch for a passenger to start the automatic driving system, a physical input device such as a button or a touch panel, a gesture input device using a camera or infrared rays, a voice input device, and the like. The automatic driving setting unit 4 outputs information input by the passenger via the input device to an automatic driving control unit 11.

Here, if the autonomous driving control unit 11 receives the request for automatic driving by the automatic driving setting unit 4, the autonomous driving control unit 11 calculates a trajectory on which the vehicle moves based on the external information such as the camera 1, the radar 2, and the own vehicle position sensor 3. The autonomous driving control unit 11 outputs a control command such as a brake and a driving force to the brake control unit 13, the engine control unit 14, and the power steering control unit so as to move the vehicle along the above-described route.

The brake control unit 13, the engine control unit 14, and the power steering control unit 15 output an operation signal to each control target (actuator (drive device)) in response to a control command for automatic driving control from the autonomous driving control unit 11.

First Embodiment

A first embodiment of the invention will be described below.

Figure 2:
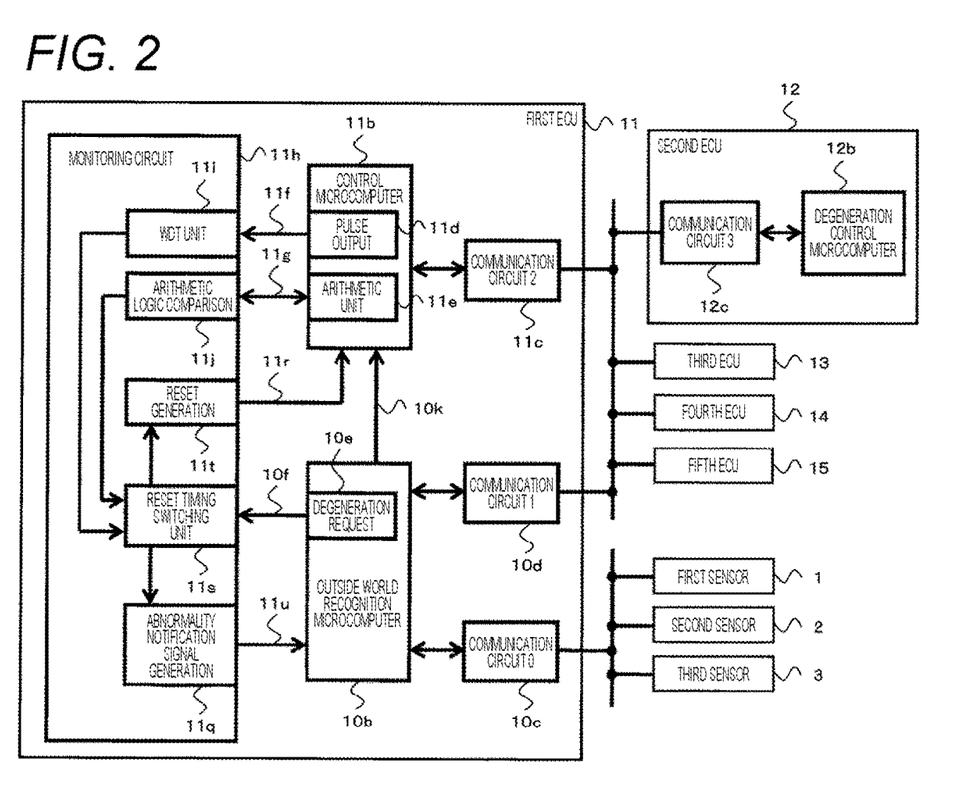
FIG. 2 is a diagram illustrating an internal configuration of an autonomous driving control unit (first ECU) in a first embodiment of the invention.

FIG. 2 is a diagram illustrating an internal configuration of the autonomous driving control unit (first ECU) 11 according to the first embodiment.

In FIG. 2, an outside world recognition microcomputer (outside world recognition unit) 10b in the autonomous driving control unit 11 recognizes the outside world information of the vehicle based on information from an external sensor such as the first sensor, the second sensor, or the third sensor, and determines that the collision potential of the own vehicle is high in a case where the control microcomputer 11b is reset based on the recognized outside world information of the vehicle.

In this situation, an example will be described below in which, when a monitoring circuit 11h detects an abnormal operation of the control microcomputer 11b, the control microcomputer 11b is reset after the control is transferred to the degeneration control microcomputer (degeneration control unit) 12b.

Here, the control microcomputer 11b is defined as a control command generation unit that generates a control command to an external actuator (drive device) control unit.

The autonomous driving control unit 11, which is a driving control device for automatic driving, has two microcomputers: the outside world recognition microcomputer 10b and the control microcomputer 11b. The outside world recognition microcomputer 10b includes a communication circuit 10c (communication circuit 0) and a communication circuit 10d (communication circuit 1). In addition, the control microcomputer 11b includes a communication circuit 11c (communication circuit 2).

In addition, the degeneration control unit 12 that operates in place of the autonomous driving control unit 11 when the autonomous driving control unit 11 fails includes the degeneration control microcomputer 12b and a communication circuit 12c (communication circuit 3). The degeneration control microcomputer 12b generates a degenerated control command from the control command generated by the control microcomputer 11b.

In FIG. 2, the autonomous driving control unit 11 includes the outside world recognition microcomputer 10b and the control microcomputer 11b, and the degeneration control unit 12 includes the degeneration control microcomputer 12b. Alternatively, the outside world recognition microcomputer 10b, the control microcomputer 11b, and the degeneration control microcomputer 12b may be disposed in the autonomous driving control unit 11.

In addition, the control microcomputer 11b and the degeneration control microcomputer 12b may be provided in the autonomous driving control unit 11, and the outside world recognition microcomputer 10b may be disposed in a control unit other than the autonomous driving control unit 11.

The outside world recognition microcomputer 10b receives sensor information (outside world recognition information) from the camera 1 (first sensor), the radar 2 (second sensor), and the own vehicle position sensor 3 (third sensor), which are external sensors, through the communication circuit 10c. The outside world recognition microcomputer 10b recognizes the situation of the outside world based on the transmitted sensor information, and generates trajectory information on which the own vehicle moves.

For this reason, the outside world recognition microcomputer 10b can be defined as a trajectory information generation unit.

The outside world recognition microcomputer 10b transmits the generated trajectory information to the control microcomputer 11b through the trajectory information communication line 10k. The control microcomputer 11b externally receives information of an external recognition sensor such as a wheel speed sensor, an acceleration sensor, and a yaw rate sensor (not illustrated) via the communication circuit 11c (the communication circuit 2) (this information is also included in the outside world recognition information) from an external ECU (control device). Based on the information and the trajectory information calculated by the outside world recognition microcomputer 10b, an actuator control command is respectively generated and transmitted to the brake control unit 13 (third ECU) and the engine control unit 14 (fourth ECU), and the power steering control unit 15 (the fifth ECU).

The monitoring circuit 11h for monitoring the control microcomputer 11b is connected to the control microcomputer 11b, and the monitoring circuit 11h includes a first monitoring unit that detects an abnormality of the control microcomputer 11b at an abnormality detection time T1 (first abnormality detection time), and a second monitoring unit that detects an abnormality of the control microcomputer 11b at an abnormality detection time T2 (second abnormality detection time) which is longer than the detection time of the abnormality detection time T1.

The first monitoring unit and the second monitoring unit are configured so that the determination criteria for abnormality detection are different from each other. The determination criteria for abnormality detection of the first monitoring unit is for a minor abnormality, and the determination criteria for abnormality detection of the second monitoring unit are for a severe abnormality compared to the criteria for abnormality detection of the first monitoring unit.

The first monitoring unit is a watchdog timer 11i (WDT unit) that determines the normality of the program operation of the control microcomputer 11b. A periodic high/low pulse signal having a fixed period is output from the pulse output unit 11d of the control microcomputer 11b via a communication line 11f, and the watchdog timer 11i (WDT unit) determines the normality of the pulse output unit 11d.

The second monitoring unit is an arithmetic logic comparison unit 11j that determines the normality of an arithmetic unit 11e of the control microcomputer 11b. By bidirectional communication via a communication line 11g between the monitoring circuit 11h and the control microcomputer 11b, the arithmetic logic comparison unit 11j periodically transmits an interrogation signal (for example, a certain random numerical value and an arithmetic expression using the numerical value) to the arithmetic unit 11e of the control microcomputer 11b.

Then, a response signal of the arithmetic unit 11e corresponding to the interrogation signal is compared with an expected value calculated in advance by the arithmetic logic comparison unit 11j, and the normality of the control microcomputer 11b is determined.

The second monitoring unit is a comparison of the arithmetic logic, counts up an abnormality counter in a case where the comparison does not match, and can adjust the abnormality detection time by setting the criteria for finally determining an abnormality. In this way, the abnormality detection time T2 longer than the abnormality detection time T1 is set in advance.

The first monitoring unit and the second monitoring unit are collectively referred to as a monitoring unit.

Further, the monitoring circuit 11h that monitors the control microcomputer 11b is a logic circuit, and can be built in the outside world recognition microcomputer 10b.

On the other hand, the outside world recognition microcomputer 10b is a microcomputer that recognizes the situation of the outside world based on the transmitted sensor information and generates the trajectory information of the own vehicle, and periodically calculates the collision potential with surrounding objects.

The outside world recognition microcomputer 10b outputs a degeneration request signal 10f, which shifts the automatic driving control from the control microcomputer 11b to the degeneration control microcomputer 12b, to the monitoring circuit 11h in a case where an abnormality occurs in the control microcomputer 11b, and the control microcomputer 11b is reset.

The degeneration request signal 10f output from the degeneration request signal generation unit 10e of the outside world recognition microcomputer 10b is designed to be a Low output in a case where the collision potential of the own vehicle is low and to toggle the output to High when the collision potential is high.

In a reset timing switching unit 11s of the monitoring circuit 11h, the abnormality detection signal of the control microcomputer 11b is input from both the WDT unit 11i as the first monitoring unit and the arithmetic logic comparison unit 11j as the second monitoring unit. Then, the reset timing switching unit 11s determines, based on the degeneration request signal 10f, which of the WDT unit 11i and the arithmetic logic comparison unit 11j resets the control microcomputer 11b.

In other words, whether to reset at the abnormality detection time T1 or at the abnormality detection time T2 is determined by the degeneration request signal 10f. The abnormality notification signal generation unit 11q supplies an abnormality notification signal 11u to the outside world recognition microcomputer 10b according to the signal supplied from the reset timing switching unit 11s.

Figure 3:
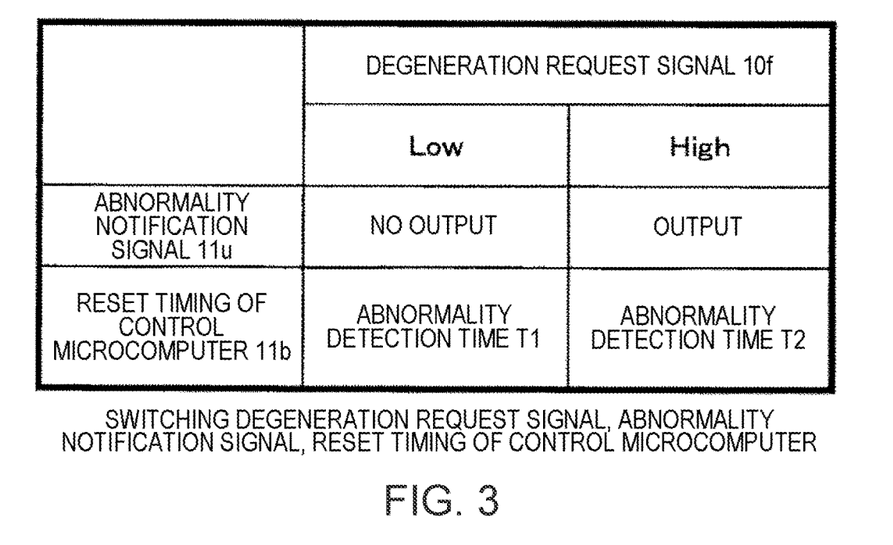
FIG. 3 is a table illustrating a relation between a degeneration request signal and a reset timing of a control microcomputer according to the first embodiment of the invention.

FIG. 3 is a table illustrating the degeneration request signal 10f, the abnormality notification signal 11u, and the reset timing of the control microcomputer 11b in the first embodiment of the invention.

In FIG. 3, in a case where the degeneration request signal 10f is Low, the abnormality detection signal 11u is not output even if an abnormality is detected by the control microcomputer 11b, and the control microcomputer 11b is reset at the abnormality detection time T1. On the other hand, in a case where the degeneration request signal 10f is High, when an abnormality is detected by the control microcomputer 11b, the abnormality notification signal 11u is output, and the control microcomputer 11b is reset at the abnormality detection time T2.

Figure 4:
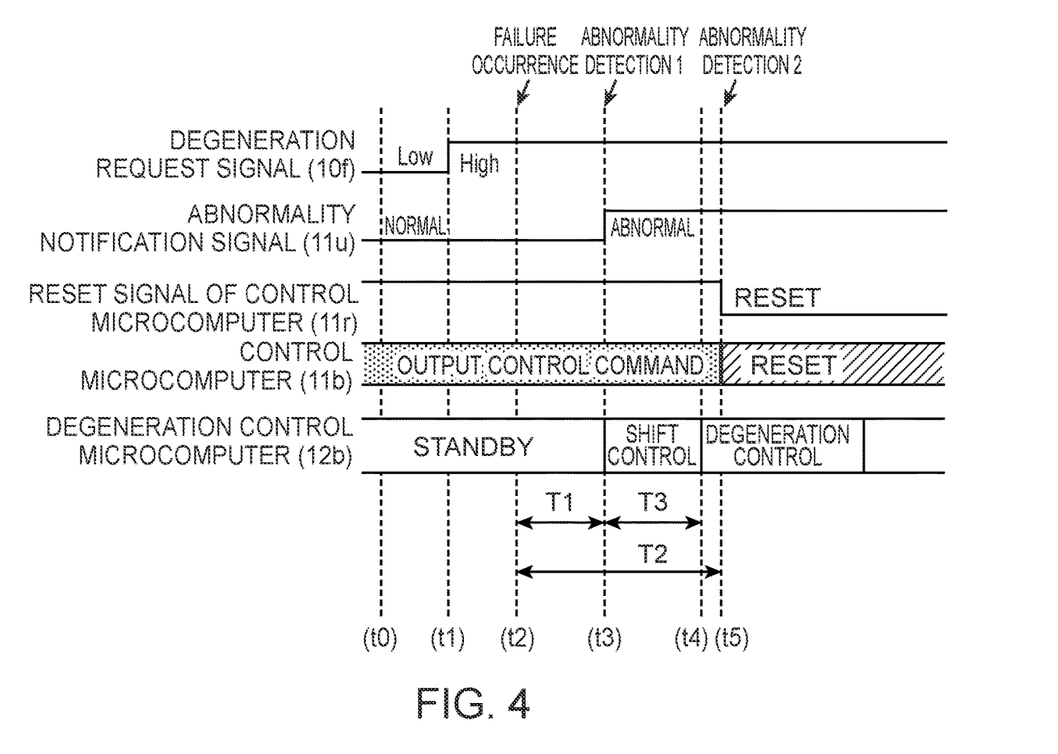
FIG. 4 is a time chart at the time of control transition in a case where a degeneration operation is executed in the first embodiment of the invention.

FIG. 4 is a time chart at the time of control transition in a case where the degeneration operation is executed in the first embodiment of the invention.

In FIG. 4, at timing (t0), the control microcomputer 11b outputs a control command to an external actuator control unit, and the degeneration control microcomputer 12b is in a standby state. The degeneration request signal is a Low output at timing (t0), but becomes High at timing (t1) due to an increase in the collision potential.

In a case where a failure occurs in the control microcomputer 11b at the subsequent timing (t2), the abnormality notification signal (11u) becomes High at timing (t3) after the abnormality detection time T1 has elapsed from the occurrence of the failure (abnormality detection 1 by the WDT unit 11i). The control microcomputer abnormality (control command generation unit abnormality) is notified to the degeneration control microcomputer 12b through the outside world recognition microcomputer 10b, the communication circuit 10d, and the communication circuit 12c. The transition of the control to the degeneration control microcomputer 12b starts.

The transition preparation of the degeneration control microcomputer 12b is completed at timing (t4) when the control transition period T3 has elapsed, and the control microcomputer 11b is reset at timing (t5) when the abnormality detection time T2 has elapsed since the failure occurred (abnormality detection 2 by arithmetic logic comparison unit 11j).

Further, in a case where the failure occurring at timing (t2) (abnormality of the pulse output unit 11d) is a transient failure, even if the first monitoring unit determines that there is an abnormality, the second monitoring unit makes a deep level abnormality determination (whether the arithmetic unit 11e is abnormal), and thus there are scenes where abnormality determination is not performed. In such a case, the control microcomputer 11b is not reset at timing (t5) and control is continued.

For example, even if it is determined that an abnormality has occurred in the pulse output unit 11d due to noise, it may be determined that no abnormality has occurred in the arithmetic unit 11e. In that case, the control microcomputer 11b is not reset by a reset signal 11r from a reset generation unit 11t, and the control by the control microcomputer 11b is continued.

Due to noise, the pulse output unit 11d determines that there is an abnormality, so that the degeneration control microcomputer 12b executes the degeneration control through the control transition operation, and the degeneration control operation and the control by the control microcomputer 11b are performed in parallel.

In this case, the brake control unit 3, the engine control unit 14, and the power steering control unit 15 are preset to give priority to a control command from the control microcomputer 11b. Thus, the control by the control microcomputer 11b is continued.

As described above, according to the first embodiment of the invention, even in a case where an abnormality is detected in the control microcomputer 11b in a scene with a high collision potential, the control can be safely shifted to the degeneration control microcomputer 12b without a blank period of control. In addition, in the case of a transient failure such as generation of noise, the control is not shifted to the main degeneration control, and the control by the control microcomputer 11b can be continued, so that safety is ensured.

In particular, by setting the abnormality detection time T2 in a relation of T2≥T1+T3 using the abnormality detection time T1 and the control transition period T3 of the degeneration control microcomputer 12b, a blank period of control can be eliminated by resetting the control operation by the control microcomputer 11b after the degeneration control operation starts, and the reliability of the control circuit can be improved.

Next, an operation in a case where the collision potential of the own vehicle is low in the first embodiment will be described.

Figure 5:
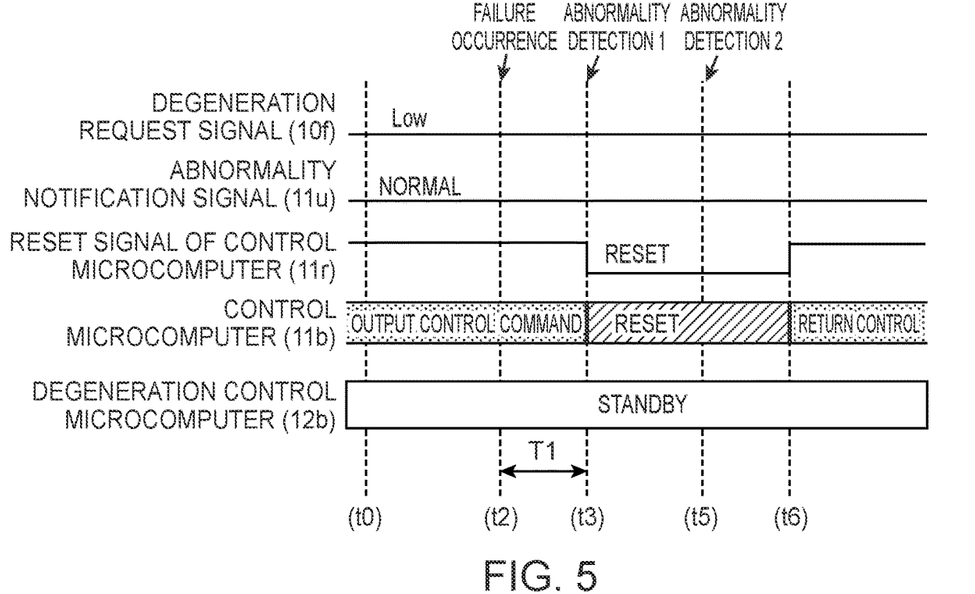
FIG. 5 is a timing chart of operation control in a case where a collision potential of an own vehicle is low in the first embodiment of the invention.

FIG. 5 is a timing chart of the operation control in a case where the collision potential of the own vehicle is low.

FIG. 5 illustrates an operation control when the monitoring circuit 11h detects an abnormal operation of the control microcomputer 11b in a situation where the outside world recognition microcomputer 10b in the autonomous driving control unit 11 determines that the collision potential of the own vehicle is low. In the case of this example, the control microcomputer 11b is reset without transferring control to the degeneration control microcomputer 12b.

In FIG. 5, at timing (t0), the control microcomputer 11b outputs a control command to an external actuator control unit, and the degeneration control microcomputer 12b is in a standby state. In a case where a failure occurs in the control microcomputer 11b at timing (t2) in a scene where the collision potential is low and the degeneration request signal 11u is a Low output, the control microcomputer 11b is reset at timing (t3) after the abnormality detection time T1 has elapsed from the failure occurrence. In this case, the degeneration request signal 11u is a Low output, the control does not shift to the degeneration control microcomputer 12b, and the control microcomputer 11b returns the control from the reset at timing (t6) after a certain time has elapsed from timing (t5).

In other words, the monitoring circuit 11h determines whether to reset the control microcomputer 11b according to whether the degeneration request signal 10f is High or Low based on the determination result of the first monitoring unit or the determination result of the second monitoring unit.

As described above, in a case where an abnormality is detected in the control microcomputer 11b in a scene where the collision potential is low, the control microcomputer 11b is reset early so that, after the time elapses, the control can be returned before the external situation of the own vehicle changes and the risk increases (the control command generation operation of the control microcomputer 11b (control command generation unit) can be returned).

Therefore, even in a case where an operation abnormality occurs in the arithmetic processing unit of the control device, control can be safely shifted to the degeneration control microcomputer, and a vehicle control device capable of improving safety can be realized.

Second Embodiment

Next, a second embodiment of the invention will be described.

Figure 6:
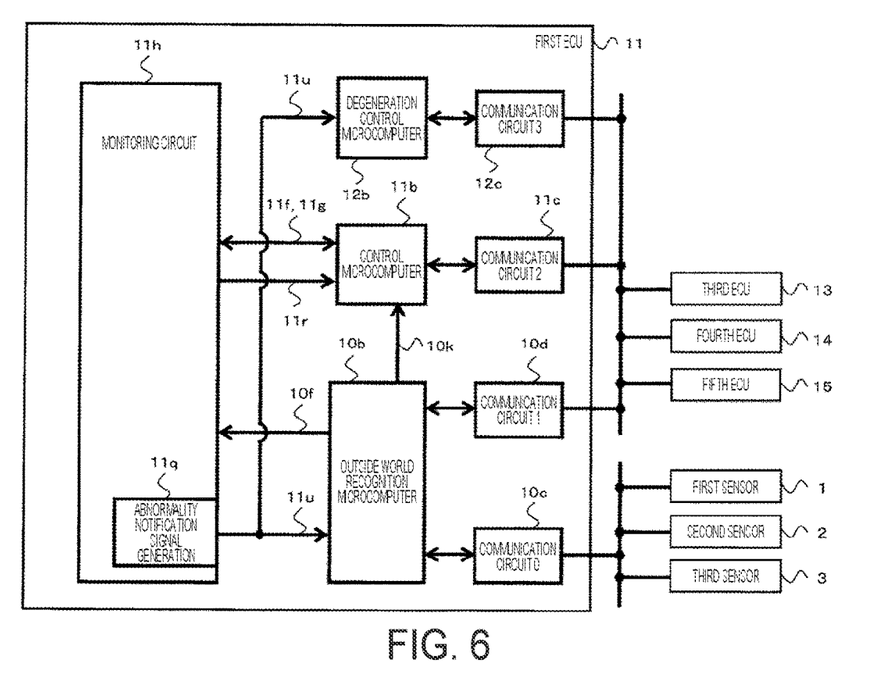
FIG. 6 is a diagram illustrating an internal configuration of an autonomous driving control unit (first ECU) in a second embodiment of the invention.

FIG. 6 is a diagram illustrating an internal configuration of the autonomous driving control unit (first ECU) 11 according to the second embodiment. FIG. 6 illustrates an example in a case where the degeneration control microcomputer 12b is disposed in the autonomous driving control unit 11 in addition to the outside world recognition microcomputer 10b and the control microcomputer 11b.

The degeneration control microcomputer 12b and the communication circuit 12c (the communication circuit 3) are disposed in the autonomous driving control unit 11. The second embodiment has substantially the same configuration as the first embodiment, except that the abnormality notification signal 11u is connected to the outside world recognition microcomputer 10b and the degeneration control microcomputer 12b inside the autonomous driving control unit 11.

Even in the second embodiment, the same effect as in the first embodiment can be obtained, and since the signal line of the abnormality detection signal 11u is easily connected to the degeneration control microcomputer 12b, the latency at the time of abnormality occurrence is improved.

Third Embodiment

Next, a third embodiment of the invention will be described.

The third embodiment has substantially the same internal configuration of the autonomous driving control unit (first ECU) 11 of the first or second embodiment, but the abnormality detection time T1 and the abnormality detection time T2 can be changed by the monitoring circuit 11h.

Figure 7:
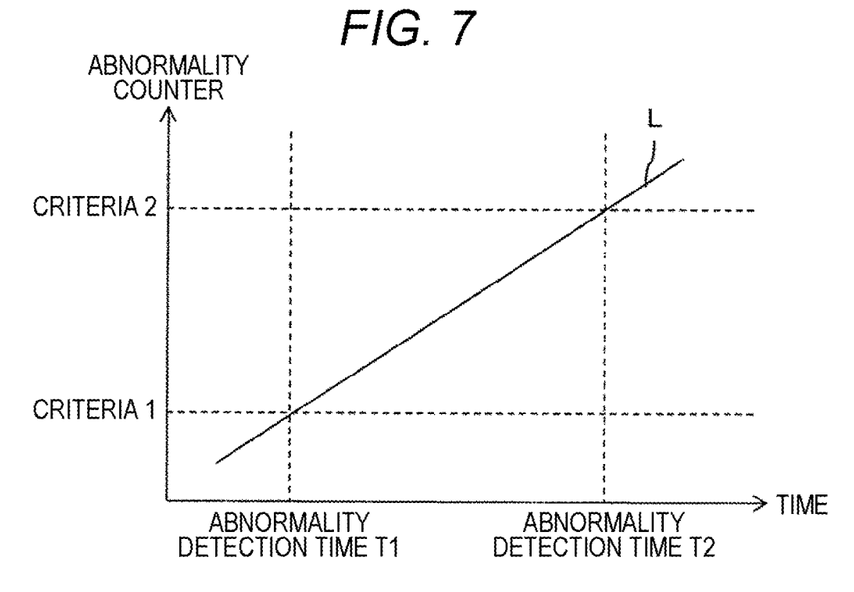
FIG. 7 is an explanatory diagram of an abnormality detection criterion and a detection time according to a third embodiment of the invention.

FIG. 7 is an explanatory diagram for setting an abnormality detection criterion (determination reference) and detection times T1 and T2 in the third embodiment.

In FIG. 7, the horizontal axis represents the elapsed time from the occurrence of the failure of the control microcomputer 11b, and the vertical axis represents the abnormality counter.

In the example illustrated in FIG. 7, a straight line L in which the abnormality counter increases with time is determined, and Criteria 1 (determination reference 1) and Criteria 2 (determination reference 2) are adjusted. The time at the point where Criteria 1 and the straight line L intersect is referred to as abnormality detection time T1, and the time at the point where Criteria 2 and the straight line L intersect is referred to as abnormality detection time T2. However, Criteria 2 is larger than Criteria 1.

As described above, by setting Criteria 1 and Criteria 2 for abnormality determination with respect to the abnormality counter value that is counted up each time an abnormality is detected, the abnormality detection time T1 and the abnormality detection time T2 can be set. In other words, Criteria 1 and Criteria 2 are set according to the number of times of abnormality detection, and the number of times of abnormality detection is larger in Criteria 2 than in Criteria 1. Then, by setting the abnormality detection time T1 to correspond to Criteria 1 and setting the abnormality detection time T2 to correspond to Criteria 2, the time difference is set so that the abnormality time detection time T2 is longer than the abnormality detection time T1.

By setting the abnormality detection time T2 in a relation of T2≥T1+T3 using the abnormality detection time T1 and the control transition period T3 of the degeneration control microcomputer 12b, a blank period of control by reset of the control microcomputer 11b is eliminated. Therefore, the reliability of the control circuit can be improved.

Even in the third embodiment, the same effects as those of the first and second embodiments can be obtained. In addition, the abnormality detection times T1 and T2 can be set according to the applied vehicle and the like. Appropriate degeneration operation transition control can be performed according to the applied vehicle and the like.

Fourth Embodiment

Next, a fourth embodiment of the invention will be described. The fourth embodiment is a configuration example using two monitoring circuits and a logic gate.

Figure 8:
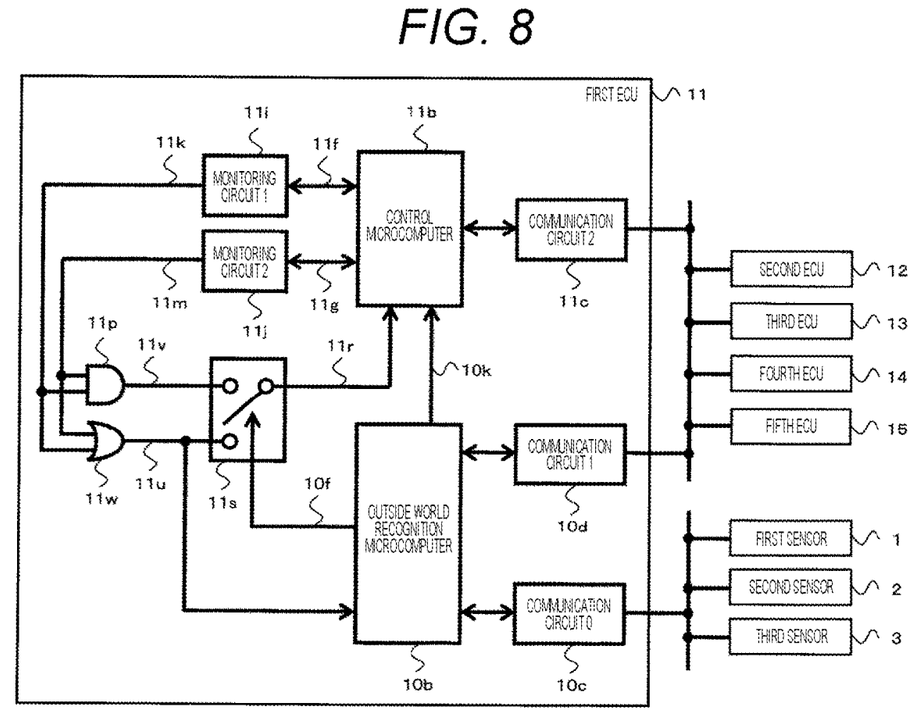
FIG. 8 is a diagram illustrating an internal configuration of an autonomous driving control unit (first ECU) in a fourth embodiment of the invention.

FIG. 8 is a diagram illustrating an internal configuration of the autonomous driving control unit (first ECU) 11 according to the fourth embodiment.

In FIG. 8, a monitoring circuit 11i (first monitoring unit) for monitoring the control microcomputer 11b and a monitoring circuit 11j (second monitoring unit) are connected to the control microcomputer 11b. As in the first embodiment, the monitoring circuit 11i is a watchdog timer that determines the normality of the program operation of the control microcomputer 11b, and the monitoring circuit 11j is an arithmetic logic comparison unit that determines the normality of the arithmetic unit 11e of the control microcomputer 11b. Each circuit includes different monitoring means.

The normality determination results of the monitoring circuit 11i (first monitoring unit) and the monitoring circuit 11j (second monitoring unit) are connected to an input terminal of an AND gate 11p and an input terminal of an OR gate 11w as a signal 11k and a signal 11m, respectively.

The gate output of the OR gate 11w reacts in a case where an abnormality is detected by any one of the monitoring circuits 11i and 11j, and the abnormality notification signal 11u is notified to the outside world recognition microcomputer 10b.

On the other hand, an output signal 11v of the AND gate 11p reacts in a case where an abnormality is detected by both of the monitoring circuits 11i and 11j, thereby enabling more reliable abnormality detection.

Therefore, since the gate output of the OR gate 11w and the output of the AND gate 11p react at different timings, it is possible to generate the abnormality detection time T1 and the abnormality detection time T2 as in the first embodiment.

In addition, similarly to the first embodiment, in a case where the control microcomputer 11b is reset due to the occurrence of an abnormality in the control microcomputer 11b, the outside world recognition microcomputer 10b outputs the degeneration request signal 10f to a reset timing switching circuit 11s to determine whether to shift the automatic driving control from the control microcomputer 11b to the degeneration control microcomputer 12b.

Figure 9:
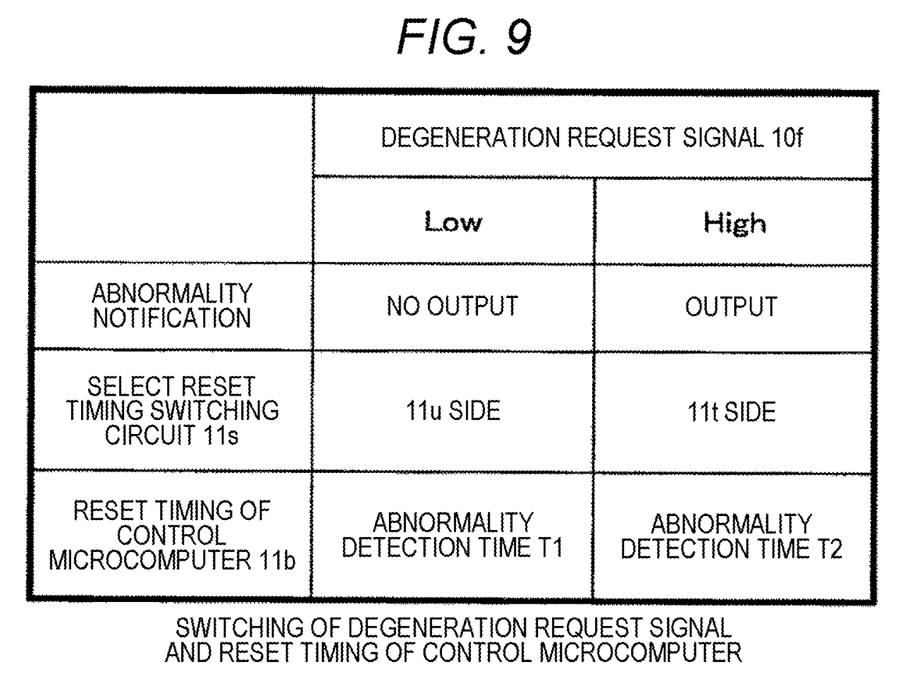
FIG. 9 is a table illustrating a relation between a degeneration request signal and a reset timing of a control microcomputer in the fourth embodiment of the invention.

FIG. 9 is a table illustrating the degeneration request signal 10f and the reset timing of the control microcomputer 11b in the fourth embodiment.

In FIG. 9, in a case where the degeneration request signal 10f is Low, the reset timing switching circuit 11s is connected to the signal 11u side, and when an abnormality is detected by the control microcomputer 11b, the control microcomputer 11b is reset at the abnormality detection time T1.

In a case where the degeneration request signal 10f is Low, even if an abnormality is detected by the control microcomputer 11b, the outside world recognition microcomputer 10b does not output an abnormality detection signal to the degeneration control unit 12, so that the control does not shift, and the control microcomputer 11b is reset and returns the control.

On the other hand, in a case where the degeneration request signal 10f is High, the reset timing switching circuit 11s is connected to the signal 11v side, and when an abnormality is detected by the control microcomputer 11b, the control microcomputer 11b is reset at the abnormality detection time T2. In a case where the degeneration request signal 10f is High, when an abnormality is detected in the control microcomputer 11b, the signal 11u is toggled, so that the outside world recognition microcomputer 10b outputs an abnormality detection signal to the degeneration control unit 12, and the control microcomputer 11b is reset at the abnormality detection time T2.

As described above, according to the fourth embodiment, similarly to the first embodiment, even in a case where an abnormality is detected in the control microcomputer 11b in a scene with a high collision potential, the control can be safely transferred to the degeneration control microcomputer 12b. In addition, in the case of a transient failure, the control is continued without being shifted, so that safety is ensured.

Fifth Embodiment

Next, a fifth embodiment of the invention will be described.

The above-described example is an example in a case where the invention is applied to an automobile. However, the invention is not limited to the automobile, and can be applied to any moving body such as a motorcycle, a factory luggage carrier, a driving robot, and the like.

The fifth embodiment is an example of an electronic control system applicable to various moving bodies.

Figure 10:
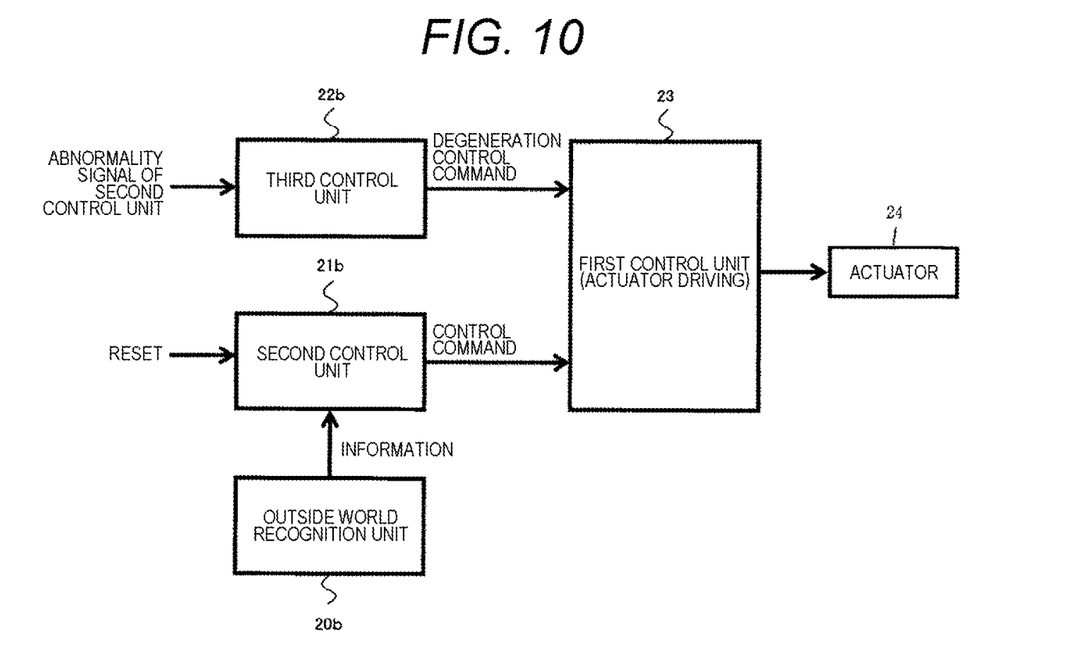
FIG. 10 is a block diagram illustrating operation functions of an electronic control system (autonomous driving control system) in a fifth embodiment of the invention.

FIG. 10 is an operation functional block diagram of the electronic control system (autonomous driving control system) of the fifth embodiment.

In FIG. 10, the electronic control system includes an outside world recognition unit 20b, a first control unit 23 that drives an actuator (drive device) 24, a second control unit 21b which receives information from the outside world recognition unit 20b and transmits a control command to the first control unit 23, and a third control unit 22 which performs control to command the degeneration operation to the first control unit 23 in a case where the second control unit 21b detects an abnormality.

In a case where the outside world recognition unit 20 determines that an external situation in which the collision potential with an external object is high, and detects an abnormality of the second control unit 21b itself, the second control unit 21b shifts the control to the third control unit 22b and resets the second control unit 21b itself.

In addition, in a case where the outside world recognition unit 20 determines an external situation in which the collision potential with the external object is low, and when an abnormality of the second control unit 21b itself is detected, the second control unit 21b immediately resets the second control unit 21b itself, and returns to a control command operation. When an abnormality signal is supplied from the second control unit 21b, the third control unit 22b outputs a degeneration control command to the first control unit 23.

Figure 11:
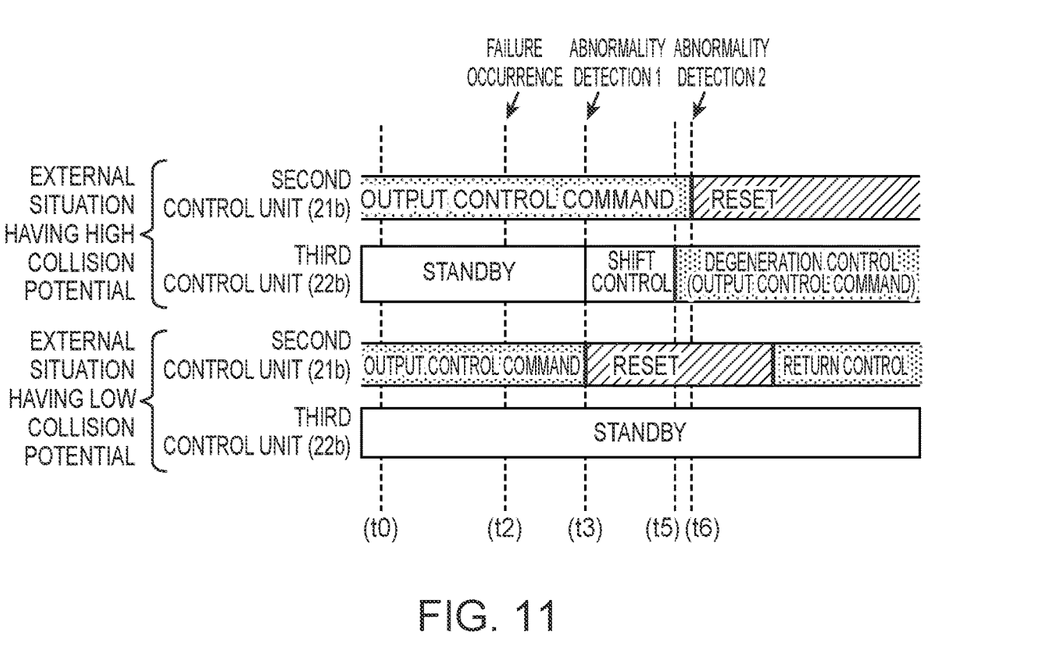
FIG. 11 is a timing chart of an operation when a failure occurs in the fifth embodiment.

FIG. 11 is an operation timing chart of when a failure occurs in the fifth embodiment.

In FIG. 11, an external situation where the collision potential is high will be described. At time (t0), no failure has occurred, the second control unit 21b outputs a control command to the first control unit 23, and the third control unit 22b is in a standby state.

When a failure occurs at time (t2), an abnormality is detected at time (t3) (abnormality detection 1), and the third control unit 22b starts shifting to the degeneration control according to the abnormality signal from the second control unit 21b. The abnormality detection 1 is a detection of an abnormality of the program operation determined by the first monitoring unit similar to the first to fourth embodiments.

Then, when the transition to the degeneration control of the third control unit 22b ends at time (t4), the third control unit 22b outputs a control command at the time of degeneration to the first control unit 23. Thereafter, at time (t5), an abnormality is detected (abnormality detection 2), and the second control unit 21b resets the second control unit 21b itself.

The abnormality detection 2 is a detection of an abnormality of the arithmetic unit determined by the second monitoring unit similar to the first to fourth embodiments.

Next, an external situation where the collision potential is low will be described with reference to FIG. 11. At time (t0), no failure has occurred, the second control unit 21b outputs a control command to the first control unit 23, and the third control unit 22b is in a standby state.

When a failure occurs at time (t2), an abnormality is detected at time (t3) (abnormality detection 1), and the second control unit 21b itself resets. The abnormality detection 1 is a detection of an abnormality of a program operation determined by the first monitoring unit similar to the first to fourth embodiments.

Then, at time (t5), an abnormality is detected (abnormality detection 2), but the second control unit 21b maintains the reset state.

The abnormality detection 2 is a detection of an abnormality of the arithmetic unit determined by the second monitoring unit similar to the first to fourth embodiments.

After that, the second control unit 21b returns the control.

The third control unit 22b maintains the standby state in an external situation where the collision potential is low.

As described above, according to the fifth embodiment of the invention, even in a case where an abnormality is detected in the second control unit 21b in a scene with a high collision potential, the control is safely transferred to the third control unit 22b without generating a control blank period, the control blank period can be eliminated, and the reliability of the control circuit can be improved.

In addition, in a case where an abnormality is detected in the second control unit 21b in a scene where the collision potential is low, by resetting the second control unit 21b early, the control can be returned before the external situation of the own vehicle changes and the risk increases after a lapse of time.

Therefore, even in a case where an operation abnormality occurs in the arithmetic processing unit in the control device, the control can be safely transferred to the degeneration control microcomputer, and an electronic control system capable of improving safety can be realized.

Next, in the first to fifth embodiments, how to set the degeneration request signal according to the external situation will be described.

Figure 12:
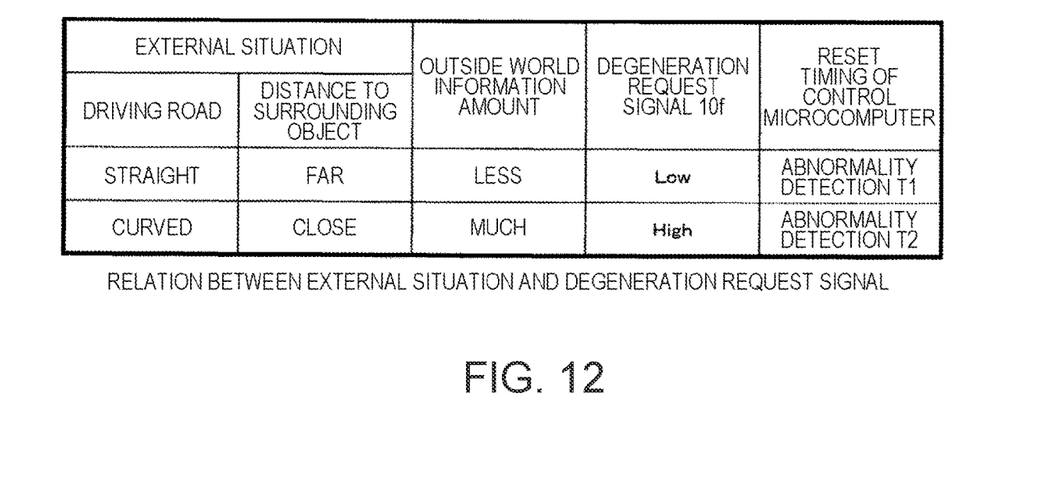
FIG. 12 is an explanatory diagram of how to set a degeneration request signal according to an external situation in the first to fifth embodiments of the invention.

FIG. 12 is a table illustrating the relation between the external situation and the degeneration request signal. With reference to FIG. 12, switching of the reset timing of the control microcomputer 11b according to the external situation and the outside world information amount will be described.

In FIG. 12, in a case where the driving road is straight and the distance to the surrounding object is long and the amount of external information is less as the external situation, the outside world recognition microcomputer 10b determines that the collision potential (collision possibility) between the own vehicle and the surrounding object is low. Therefore, the outside world recognition microcomputer 10b does not request the degeneration (the degeneration request signal 10f is a Low output), and resets the control microcomputer 11b at the abnormality detection time T1.

The outside world recognition microcomputer 10b periodically predicts and generates the trajectory on which the own vehicle runs. Then, the collision potential in the generated driving trajectory of the own vehicle is determined. In a case where the driving road is straight, it is considered that the trajectory itself is almost unchanged even in the blank section of the control in a case where the control microcomputer 11b is reset even during the control, and it is possible to estimate that the collision potential is low (determinable).

In other words, it is possible to determine the possibility of collision according to the shape of the road on which the own vehicle is predicted to run.

On the other hand, in a case where the driving road is a curve as the external situation, in a case where the distance to the surrounding objects of the own vehicle is short, or in a case where the amount of information on the outside world is large, the collision potential with the own vehicle may be high, so that the degeneration request is performed (the degeneration request signal is output High). The transition preparation to the degeneration control is started by notifying the degeneration control microcomputer 12b of the abnormality of the control microcomputer 11b at the abnormality detection time T1, and the control microcomputer 11b is reset at the abnormality detection time T2 after the transition preparation is completed.

In other words, it is possible to determine the possibility of collision according to the amount of information on the outside world where the own vehicle runs.

As described above, if the degeneration request signal is switched according to the external situation, in a case where an abnormality is detected in the control microcomputer 11b in a scene where the collision potential is low, the control microcomputer 11b is reset early so that the control can be returned before the external situation of the own vehicle changes and the risk increases after time elapses.

In addition, in a case where an abnormality is detected in the control microcomputer 11b in a scene with a high collision potential, the degeneration control microcomputer 12b starts preparations for transition early, and resets the control microcomputer 11b at the abnormality detection time T2 after the transition preparation is completed. Therefore, a blank section of control is eliminated, and control transfer with high security is possible.

Further, in each determination criterion illustrated in FIG. 12, it is also possible to determine the possibility of collision with the own vehicle based only on the shape of the driving road, only the distance to the surrounding object, or only the outside world information amount.

REFERENCE SIGNS LIST 1 camera
2 radar
3 own vehicle position sensor
4 automatic driving setting unit
11 autonomous driving control unit
12 degeneration control unit
13 brake control unit
14 engine control unit
15 power steering control unit
10b outside world recognition microcomputer
10c, 10d, 11c, 12c communication circuit
10f degeneration request signal
10k trajectory information transmission line
11b control microcomputer
12b degeneration control microcomputer
11h monitoring circuit
11i WDT unit
11j arithmetic logic comparison unit
11p AND gate 11q abnormality notification signal generation unit
11r reset signal
11s reset timing switching circuit
11t reset generation unit
11u abnormality notification signal
11w OR gate
20b outside world recognition unit
21b second control unit
22b third control unit
23 first control unit
24 actuator

The invention claimed is:

1. A vehicle control device, comprising:
a control command generation unit that generates a control command for a drive device of the vehicle;
an outside world recognition unit that recognizes external information of the vehicle; and
a monitoring circuit that includes a monitoring unit to monitor an operation of the control command generation unit and a reset generation unit to reset the control command generation unit when the monitoring unit detects an abnormality of the control command generation unit,
wherein the monitoring unit includes
a first monitoring unit that detects an abnormality in the control command generation unit at a first abnormality detection time after an abnormality has occurred in the control command generation unit, and
a second monitoring unit that detects an abnormality in the control command generation unit at a second abnormality detection time longer than the first abnormality detection time after an abnormality has occurred in the control command generation unit, and
wherein the monitoring circuit determines whether the control command generation unit is reset by the reset generation unit according to an abnormality detection of the first monitoring unit, or the control command generation unit is reset by the reset generation unit according to an abnormality detection of the second monitoring unit based on outside world information of the vehicle recognized by the outside world recognition unit.

2. The vehicle control device according to claim 1,
wherein the drive device for the vehicle further includes a degeneration control unit that generates a control command degenerated from the control command generated by the control command generation unit,
wherein the second abnormality detection time is set to be equal to or more than a time when a control transition of the degeneration control unit ends after an abnormality has occurred in the control command generation unit, and
wherein, in a case where it is determined that the degeneration control unit needs to generate the degeneration control command based on outside world information of the vehicle recognized by the outside world recognition unit, the monitoring circuit resets the control command generation unit by the reset generation unit according to an abnormality detection of the second monitoring unit.

3. The vehicle control device according to claim 2,
wherein the degeneration control unit includes a monitoring circuit.

4. The vehicle control device according to claim 2,
wherein the outside world recognition unit determines whether a possibility of the vehicle colliding with an object around the vehicle is high or low, and in a case where the possibility of collision is low, the monitoring circuit resets the control command generation unit by the reset generation unit based on an abnormality detection result of the first monitoring unit, and a control command generation operation of the control command generation unit is returned after resetting.

5. The vehicle control device according to claim 2,
wherein the outside world recognition unit determines whether the vehicle has a high or low possibility of collision with an object around the vehicle, and in a case where it is determined that a possibility of collision is high, and the monitoring circuit notifies the degeneration control unit of the control command generation unit abnormality based on an abnormality detection result of the first monitoring unit, and resets the control command generation unit by a reset generation unit based on an abnormality detection result of the second monitoring unit.

6. The vehicle control device according to claim 1,
wherein determination reference 1 set by the number of times of abnormality detection and determination reference 2 whose number of times of abnormality detection is larger than determination reference 1 are set, and the first abnormality detection time is made to correspond to determination reference 1 and the second abnormality detection time is made to correspond to determination reference 2, and a time difference between the first abnormality detection time and the second abnormality detection time is provided.

7. The vehicle control device according to claim 1,
wherein the first monitoring unit and the second monitoring unit are different from each other in a determination reference of an abnormality detection.

8. The vehicle control device according to claim 7,
wherein the determination reference of the abnormality detection in the second monitoring unit is for a severe abnormality as compared with the determination reference for abnormality detection in the first monitoring unit.

9. The vehicle control device according to claim 5,
wherein the outside world recognition unit predicts and generates a driving trajectory of the vehicle, and determines a possibility of collision on the generated driving trajectory of the vehicle.

10. The vehicle control device according to claim 5,
wherein the outside world recognition unit determines a possibility of collision according to a distance from the vehicle to a surrounding object.

11. The vehicle control device according to claim 5,
wherein the outside world recognition unit determines a possibility of collision according to a shape of a driving road on which the vehicle runs.

12. The vehicle control device according to claim 5,
wherein the outside world recognition unit determines a possibility of collision according to the amount of outside world information of the vehicle.

* * * * *